United States Patent Office 2,747,299
Patented May 29, 1956

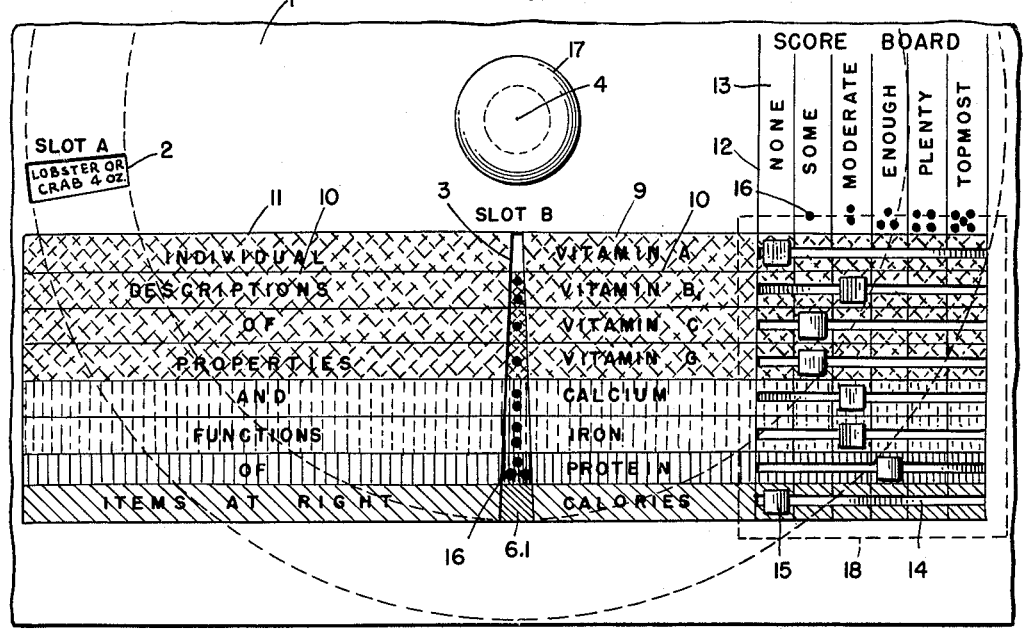
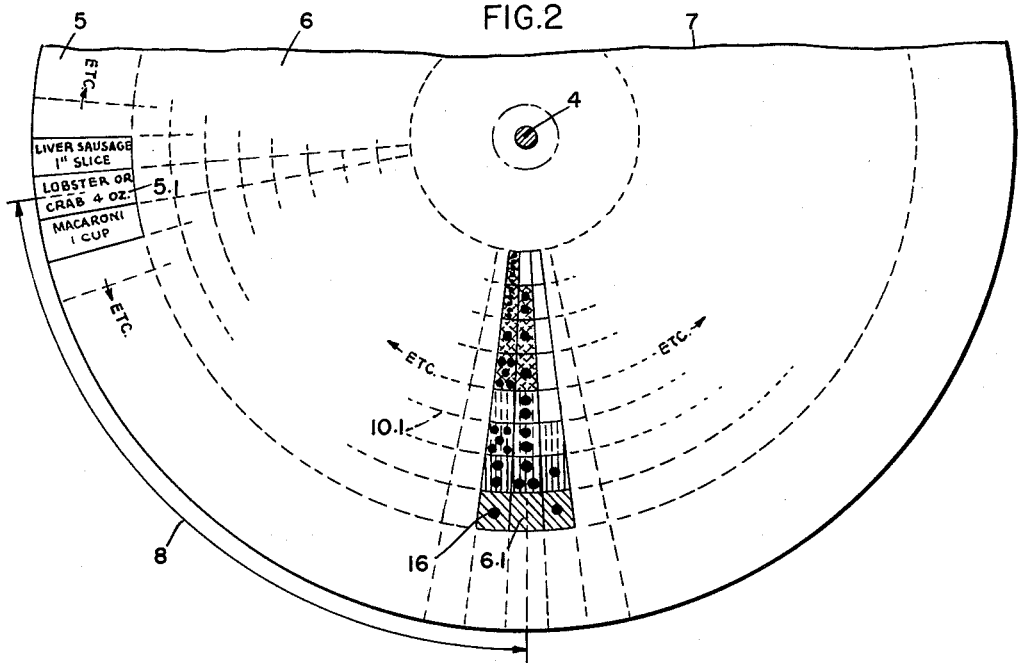
INVENTORS:
RUPERT C. HERZOG
GLADYS R. ARNOLD

2,747,299

NUTRITIVE EVALUATING FOOD ITEM SELECTOR

Rupert C. Herzog and Gladys R. Arnold, Chicago, Ill.

Application August 18, 1951, Serial No. 242,516

4 Claims. (Cl. 35—74)

This invention relates particularly to methods and means for evaluating the nutritional contents of foods and more generally to devices of the class in which articles are listed in relation to data of various kinds, in which the surface of the chart is overlaid with a mask sheet having apertures arranged for relating the individual articles with specific items of data, and in which there is provision for summarizing the aggregate quantities of selected data with respect to a plurality of articles selected from the list.

The main objects of the present invention are to provide improved means for readily selecting individual items of food for specific nutritive values, and scoring the aggregate nutritive values of a series of food articles selected for an individual serving of a meal; and to provide an improved form of food-selecting-chart having a sheet on which articles of food are listed in relation to measurements of quantities of their nutrient ingredients in terms of a common rating factor, and having an overlaying mask sheet arranged for convenient isolation of individual items from the list together with indicia indicating the relative proportions of such ingredients, with such indicia shown in registry with a list of ingredients on the mask sheet, together with individual scales for scoring these factors cumulatively with respect to a plurality of articles selected for a meal.

The principal purpose of this invention is to provide means for simplifying the procedures of a person who is planning meals and who wishes to balance the foods of such meals in such manner as to provide an adequate supply of vitamins, minerals, protein and calories, to meet the requirements of any adult person regardless of sex, age, weight, degree of activity, or climatic exposure. It allows for differences in individual requirements by providing for variations in calorie intake, in which connection it provides the means for insuring an adequate accompaniment of vitamins, minerals and protein, which is a foremost requisite of good nutrition. As determined by scientific investigations, the various individual items of these nutrients have different measurements of the quantities thereof required daily for a person in good health and the use of these measurements for the purpose of appraising the nutritive value of a meal or of the daily consumption of a person's individual food ration is so complicated that it is impractical for lay persons to resort to such calculations.

According to the present invention, a common unit measure is derived by dividing the established measure of the daily requirement per person of each of these items by three, the number of daily meals, and then dividing such quotients by some common arbitrary figure that is selected as representing the number of desired stages in a scoring scale. This provides a fractional scoring unit that is common to individual score scales for the various nutrients that are to be taken into account. In order to facilitate selection of food items for an adequate meal, a device in the form of a chart is provided in which each service quantity of a selected food is accompanied by a quantitative analysis of its content of the various nutrients expressed in terms of multiples of this common scoring unit which, as will be understood, represents a like fractional portion of the daily requirements of each of the nutrients that is to be taken into account. This common scoring unit thus enables a person to plan a meal adequate for a person's needs of each of the nutrients and can be used as will hereinafter appear regardless of whether or not the planner knows the actual amount of a person's daily needs of these nutrients in terms of established scientific measurements.

A specific embodiment of this invention is illustrated somewhat schematically in the accompanying drawings in which:

Figure 1 is a top plan partly broken away of a nutritive evaluating food item selector, constructed according to this invention, comprising a data sheet and an overlying mask sheet, designed and arranged so as to simplify the selection and evaluation of food items for a meal which will contain adequate quantities of vitamins, minerals, protein and calories, for a normal adult person's needs.

Fig. 2 is a schematic and fragmentary view of the data sheet member of the chart of Fig. 1, on which various food items are listed and related to their respective service portions and to the quantities of their ingredient components of such portions, which quantities are expressed in terms of a common scoring unit.

In the form shown in the drawings, the device comprises a mask sheet 1 which has an aperture 2 designated slot A and an aperture 3 designated slot B. The sides of these slots are radial with respect to a pivotal center 4; they are of the same angular width between their radial sides and their length corresponds to the widths of annular zonal areas 5 and 6, respectively, of a data sheet in the form of a rotary disk 7 which is pivoted at 4 to the mask sheet 1. In the zone 5 there is listed in an annular series of unit segmental spaces 5.1 each of the same area as that of slot A a large number of usual items of food each occupying an individual unit space 5.1 together with an indication of a service portion suitable for a person at a single meal.

The circular form of the data sheet 7 is preferred because it brings the information that is contained thereon into compact form and the pivotal connection between the data sheet and mask sheet is the most desirable method of connecting the sheets for relative movement so as to expose the unit spaces 5.1 of the zone 5 singly and in succession at slot A, while the data regarding the nutritive ingredients of the respective foods of each such unit space 5.1 are brought into registry with the slot B as a single row of unit spaces 6.1.

The annular rows of spaces in zones 5 and 6 are, therefore, longitudinally disposed with respect to the direction of movement of the data sheet and side-by-side in the same general direction. In zone 6, the data in the same annular or longitudinal row of unit spaces 6.1 relate to the same nutrient. Zone 6 is subdivided by circular lines into a plurality of concentric annular rows of unit spaces 6.1 and by radial lines into transverse rows of such unit spaces.

Each of the food items, together with its service quantity indication, is arranged in a single segmental unit space 5.1 in the list in zone 5 so that it may appear individually on slot A, when the disk 7 is turned to bring it into registry with said slot of the mask sheet 1. The nutritional factors for each food item in zone 5 are, however, indicated in a radial row of spaces 6.1 in zone 6 angularly displaced from the zone 5 reference to the respective food item according to the angular displacement of the slot B with respect to slot A. This displacement, indicated in Fig. 2 by arrow 8, serves to bring the nomenclature on disk 7 into improved relation to the matter on mask sheet 1, for ease of reading, and permits a more thorough functionalizing of the directional matter on mask sheet 1 for ease in the following of the instructions for operation of the device.

The computation of quantities of nutritive value, indicated by the indicia in zone 6 on the chart, is arrived at by first determining from scientific sources, such for example, as the dietary allowances established in 1948 by the Food and Nutrition Board of the National Research Council. These factors are indicated on the chart 7, for quick visualization by the use of numerical indicia, comprising dots on a background of color to represent scoring units. The color also extends to spaces without numerical indicia to indicate the presence of less than a unit score quantity of an ingredient but more than a negligible quantity, leaving white spaces to indicate a total or almost total absence of the nutrient.

In the chart shown, the nutritive values of the indicated specific service portions of foods listed in zone 5 are presented numerically in units of like fractional proportions of an individually chosen amount of each ingredient that is regarded as enough for an individual person's needs. These common units represent different absolute quantities but equal scoring values of different ingredients and for the purpose of this specification are termed scoring units.

The slot B is situated preferably directly below pivot point 4 on mask sheet 1, and to the right of it, in a vertical column 9, is a list of nutrient ingredients of food, comprising vitamins, minerals, protein and calories. Horizontal dividing lines 10 between items of this column register with circular lines 10.1 that subdivide zone 6 of disk 7 into annular sub-zones that are in turn subdivided by radial lines angularly spaced according to the radial margins of the spaces 5.1.

In a corresponding column 11 at the left of slot B is a column, subdivided by the same horizontal lines 10 that divide column 9, there are unit spaces which contain information relating to the properties and functions of the nutrient items mentioned in the corresponding spaces in column 9.

The lines 10 are extended to the right to define extensions of the rows of columns 9 and 11 and these are subdivided by vertical lines 12 into a series of scoring columns 13. Each of the rows in the scoring area has a horizontal slot 14 extending throughout its length. Slidably mounted on the card 1 in these slots are score indicators 15.

The score board columns are individually identified as corresponding to increasing quantities of the nutritive, in terms of the scoring units; such as for example, "none," "some," "moderate," "enough," "plenty" and "topmost" and these columns also carry in their headings the same indicia of quantity, such as the dots 16, that are used to indicate scoring units in zone 6 of the data sheet of the chart.

The indicators 15, as will be understood, have a medial shank that fits slidably in the slot 14 and have heads both above and below the sheet 1 to hold them in place.

On the score board and in the annular rows of indicia into which the zone 6 of sheet 2 is divided, so as to register with the rows of columns 11 and 9 at slot B, the range of from zero to 5 scoring units is represented thus:

(blank) for "None"
. for "Some"
: for "Moderate"
∴ for "Enough"
: : for "Plenty"
:·: for "Topmost"

The designation of "Enough," for 3 scoring units, corresponds to the standard requirements of a moderately active, average adult, as well as of those with lesser requirements with a small margin of reserve. The range between 3 and 5 scoring units represents a necessary margin in all cases for scoring the vitamins and minerals as their occurrence in different foods varies widely, and allows for necessary additional calorie intake for those whose requirements exceed the amounts established as standard for the normal adult of average weight.

In the device from which Figs. 1 and 2 were drawn, coloring is employed in addition to the dots that represent scoring units, and coordination of all aspects of related groups of food factors. The colors are represented in the drawing by conventional cross-hatching, encompassing columns 11, 9 and 13 in mask sheet 1, and zone 6 of disk 7, and indicate, for example, the employment of orange for the vitamins, violet for the minerals, red for the protein, and green for the calories.

The absence of indicia or color in certain spaces 6.1 of zone 6 that appear in slot B is an indication that the particular nutrient is not found in the food identified in the corresponding space of zone 5 that appears in slot A.

The data sheet 7 is accordingly subdivided into an annular zone 5 for listing the food items in an annular row of spaces 5.1, a zone 6 subdivided by equally spaced concentric circles into a series of annular sub-zones which in turn are subdivided by radial lines into unit spaces 6.1 which are thereby arranged in intersecting annular and radial rows.

Each food item listed in the spaces 5.1 in zone 5 corresponds to a respective radial row of spaces 6.1 in zone 6 which row contains in radially successive spaces the quantitative indicia of different nutrient ingredients of the respective food article listed in a space of zone 5. All of such quantitative indicia corresponding to the same nutrient ingredient are located in spaces in the same annular subzone 6.1 of zone 6.

The operation of the score board is essentially one of totaling, for selected portions of food, the values in scoring units of certain specific nutrients and the calories as shown through slot B. The indicia in colors and dots enable the user to visualize readily the nutritive values of a great many foods permitting quick selection of suitable items for a meal.

The procedure for operating the device shown is as follows: At the start, the operator makes sure that in the score board all score indicators 15 are in the "None" column space. Having satisfied this point, he proceeds to rotate disk 7, scrutinizing in slot B the nutritive values of foods which in slot A appear in specified service quantities, until he locates a desired item. He then proceeds to move the score indicators for each of the nutrients and the calories, the number of column spaces to the right corresponding to the number of dots or other indicia employed representing scoring units as shown opposite the score indicators in slot B. The selection of additional food items is then made so that the final score for the calories will be maintained at 3, 4 or 5 scoring units according to the standard the operator has established for himself on his calorie intake. After the nutritive values of the first food item have been registered on the score board, for succeeding items, the score indicators for the vitamins and minerals are moved the number of column spaces set forth by the indicia as required, or the number of column spaces which remain for a score of 5, whichever is lower. This method is followed for the vitamins and minerals, due to the occurrence of these nutrients in foods varying widely, and for foods of good quality in the usual service quantities exceeding standard requirements by a wide margin. For the protein and calories, not being subject to such fluctuations, and for which excesses are to be watched, the final positions of the score indicators should represent as nearly as possible the summation of the indicia as viewed in slot B for the various foods selected in their specified service quantities, as shown in slot A.

By means of the device shown, the operator can institute his own program of improvement in eating habits. The procedure is as follows: He evaluates on the device his calorie intake according to his present eating habits and sets the score for his current calorie requirements to correspond to them. On all other nutrients he makes sure that the scores equal or exceed the score for the calories—thus he assures himself of a well-balanced diet.

The score for the calories he has thus established, he maintains for all meals as long as his body weight remains normal. If he finds himself either overweight or underweight, as the case may be, he decreases or increases his calorie intake in one of his day's meals by one scoring unit, at which he will continue to maintain his calorie intake, or from which he will make further periodic revisions until he finds his body weight stabilized at the required figure.

As a rule it is desirable not to allow the vitamin and mineral signals to come to a stop behind the calorie signal, nor to allow the protein signal to come to a stop either behind or ahead of the calorie signal. For example, if after scoring one or two of the principal foods desired for a meal, it is desirable to add some other food to increase the quantity of one of the vitamins, or minerals, or protein, the knob 17 is turned until a desirable additional amount of the particular ingredient appears in column B. Of course, if a particular item is then shown in slot A that is not appropriate for the meal, the operator would continue in this manner to find one or more items to add to the meal to bring the total score to the desired amount.

We claim:

1. A nutrient scoring chart, comprising a data sheet and a mask sheet relatively movable along a fixed path, said data sheet having thereon a listing zone with a series of spaces arranged along said path each containing the name of a food item with a measure of a service portion thereof, said data sheet having a nutrient rating zone at one side of and paralleling said listing zone and subdivided by crossing sets of lines into rows of spaces both paralleling and transverse to the row of spaces in said listing zone, each transverse row corresponding in relative position to a respective food item space of said listing zone, said mask sheet overlying said data sheet and being slotted to expose one food item space of said listing zone and a respective row of rating zone spaces corresponding thereto, said mask sheet having on its face opposite said such exposed rating zone space the name of a respective nutrient, said mask sheet having thereon in line with each such nutrient name a scoring scale having a sliding count indicator thereon, each such scale being subdivided into a like number of scoring units counting intervals representing like fractional parts of a certain predetermined ration of the respective nutrient, and said data sheet having, in each said transverse row of spaces in the rating zone, indicia indicating the number of scoring unit quantities of the respective nutrients contained in the service portion of the food listed in the listing zone in relation to such transverse row of spaces.

2. A nutrient scoring chart according to claim 1 in which the scoring unit indicia are numerical symbols for representing scoring quantities and color symbols for indicating the presence of the respective nutrient.

3. A nutrient scoring chart, comprising a data sheet and a mask sheet overlying said data sheet and connected thereto for relative movement along a predetermined path, said data sheet having thereon a bank of unit spaces arranged in rows paralleling said path and in transverse rows extending across said path, the unit spaces in one of the paralleling rows being respectively marked with names of different food items in stated quantities respectively, the unit spaces in other paralleling rows being marked with scoring indicia representing quantities of nutrients in such respective food items, the scoring indicia in the same paralleling row having reference to the same nutrient, those in different paralleling rows having reference to different nutrients, and those in the same transverse row having reference to the same one of the food items listed in the first-mentioned paralleling row, said mask sheet being slotted to expose simultaneously one unit space of the first said paralleling row and the respective transverse row of nutrient scoring indicia related thereto, said mask sheet having on its face the names of the nutrients positioned to identify the respective nutrient scoring indicia of each paralleling row where these are exposed, a series of countering scales located on said mask with one such scale adjacent to and alined with each of said nutrient names, each scale having an indicator slidable along same and having cumulative counting graduations common to all said counting scales.

4. A food evaluating chart, comprising a data sheet and a mask sheet pivotally connected for relative rotation, said mask sheet having therein a pair of radial slots of like angular width with respect to the axis of rotation and positioned to expose corresponding angular unit portions of different concentric annular zones of said data sheet, one of said zones having the names of food items arranged in annular series of such unit portions for appearance singly and in succession at one of said radial slots, the other of said zones having quantitative indicia of certain nutrient ingredients of each said food items arranged in like sequence in radial lines and located for appearance at the other said slot when the corresponding food item name appears at said one slot, said mask sheet having on its face the names of said ingredients arranged along said other slot to identify the respective quantitative indicia appearing in that slot, said mask sheet having thereon a series of linear scales each with an indicator manually movable therealong, each such scale being alined with a respective one of said ingredient names, and each scale having a series of linear divisions cooperable with the respective indicator for registering the respective quantitative ingredient indicia of a selected food item.

References Cited in the file of this patent

UNITED STATES PATENTS

| | | |
|---|---|---|
| 798,987 | Whitaker | Sept. 5, 1905 |
| 857,590 | Branch | June 25, 1907 |
| 1,300,339 | Brigden | Apr. 15, 1919 |
| 1,546,928 | Graham | July 21, 1925 |
| 1,600,591 | Johnston | Sept. 21, 1926 |
| 2,150,442 | Herzog | Mar. 14, 1939 |
| 2,152,604 | Perry | Mar. 28, 1939 |
| 2,548,657 | Dunn | Apr. 10, 1951 |
| 2,592,106 | Askeli | Apr. 8, 1952 |